(12) United States Patent
Miyawaki et al.

(10) Patent No.: US 8,585,537 B2
(45) Date of Patent: Nov. 19, 2013

(54) DRIVING DEVICE AND IMAGE FORMING APPARATUS

(75) Inventors: Katsuaki Miyawaki, Kanagawa (JP); Hiromichi Matsuda, Kanagawa (JP); Tetsuo Watanabe, Kanagawa (JP); Nobuo Iwata, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 317 days.

(21) Appl. No.: 13/064,132

(22) Filed: Mar. 8, 2011

(65) Prior Publication Data

US 2011/0230305 A1    Sep. 22, 2011

(30) Foreign Application Priority Data

Mar. 18, 2010  (JP) .................................. 2010-063100

(51) Int. Cl.
F16H 57/08 (2006.01)
F16H 48/30 (2012.01)

(52) U.S. Cl.
USPC ............ 475/337; 475/331; 475/346; 475/150

(58) Field of Classification Search
USPC ......................................... 475/337
See application file for complete search history.

(56) References Cited

U.S. PATENT DOCUMENTS

| | | | | |
|---|---|---|---|---|
| 2,936,644 A | * | 5/1960 | Miller | 74/421 R |
| 2,950,635 A | * | 8/1960 | Bieger et al. | 475/338 |
| 4,142,426 A | * | 3/1979 | Baranyi | 475/340 |
| 4,366,727 A | * | 1/1983 | Jonsson | 475/342 |
| 4,864,893 A | * | 9/1989 | Hori | 475/341 |
| 4,908,661 A | | 3/1990 | Iwata et al. | |
| 5,008,711 A | | 4/1991 | Sakamoto et al. | |
| 5,467,175 A | | 11/1995 | Takagaki et al. | |
| 5,599,645 A | | 2/1997 | Tamiya et al. | |
| 5,638,159 A | | 6/1997 | Kai et al. | |
| 5,678,161 A | | 10/1997 | Kurotaka et al. | |
| 5,708,938 A | | 1/1998 | Takeuchi et al. | |
| 5,799,228 A | | 8/1998 | Iwata et al. | |

(Continued)

FOREIGN PATENT DOCUMENTS

| | | | |
|---|---|---|---|
| JP | 9-211015 | * | 9/1997 |
| JP | 2001-200858 A | | 7/2001 |
| JP | 2004-219836 A | | 8/2004 |
| JP | 4360162 B2 | | 4/2005 |

OTHER PUBLICATIONS

English language abstract for patent publication JP-2005-099235 which corresponds to JP-4360162-B2.

Primary Examiner — David D Le
Assistant Examiner — Colby M Hansen
(74) Attorney, Agent, or Firm — Harness, Dickey & Pierce P.L.C.

(57) ABSTRACT

A driving device includes a planetary gear deceleration mechanism in a transmission path that transmits driving force from a driving motor to a driven member, in which the deceleration mechanism includes first and second support units into which a housing that constitutes a mechanism main body is divided, the first support unit includes carriers of at least one stage and pinion gears supported thereby, and is provided with an output unit in the carrier of the final stage, the second support unit includes an output shaft that is detachable from the output unit and a supporting unit for the output shaft, and the output shaft is supported in an insertable and removable manner with respect to the output unit of the carriers in the first and the second support units that are joined to each other.

20 Claims, 5 Drawing Sheets

(56) References Cited

U.S. PATENT DOCUMENTS

| | | |
|---|---|---|
| 5,828,926 A | 10/1998 | Iwata et al. |
| 5,848,329 A | 12/1998 | Aoyama et al. |
| 5,875,380 A | 2/1999 | Iwata et al. |
| 5,962,783 A | 10/1999 | Iwata et al. |
| 6,097,910 A | 8/2000 | Sasaki et al. |
| 6,108,508 A | 8/2000 | Takeuchi et al. |
| 6,128,459 A | 10/2000 | Iwata et al. |
| 6,142,690 A | 11/2000 | Yoshimura et al. |
| 6,184,910 B1 | 2/2001 | Sasaki et al. |
| 6,282,396 B1 | 8/2001 | Iwata et al. |
| 6,324,374 B1 | 11/2001 | Sasamoto et al. |
| 6,381,435 B2 | 4/2002 | Shinohara et al. |
| 6,526,246 B2 | 2/2003 | Iwata et al. |
| 6,556,802 B2 | 4/2003 | Sasamoto et al. |
| 6,571,076 B2 | 5/2003 | Kasahara et al. |
| 6,585,620 B1 * | 7/2003 | Bae ................. 475/331 |
| 6,757,512 B2 | 6/2004 | Miyawaki et al. |
| 6,768,891 B2 | 7/2004 | Sasamoto et al. |
| 6,882,812 B2 | 4/2005 | Kasahara et al. |
| 6,941,096 B2 | 9/2005 | Matsuda et al. |
| 6,941,102 B2 | 9/2005 | Sasamoto et al. |
| 6,949,896 B2 | 9/2005 | Andoh et al. |
| 6,996,357 B2 | 2/2006 | Matsuda et al. |
| 7,027,751 B2 | 4/2006 | Miura et al. |
| 7,054,585 B2 | 5/2006 | Sasamoto et al. |
| 7,103,305 B2 | 9/2006 | Koike et al. |
| 7,110,917 B2 | 9/2006 | Matsuura et al. |
| 7,127,198 B2 | 10/2006 | Muramatsu et al. |
| 7,184,674 B2 | 2/2007 | Satoh et al. |
| 7,203,431 B2 | 4/2007 | Shoji et al. |
| 7,203,452 B2 | 4/2007 | Miyawaki et al. |
| 7,221,891 B2 | 5/2007 | Matsumoto et al. |
| 7,245,853 B2 | 7/2007 | Muramatsu et al. |
| 7,251,444 B2 | 7/2007 | Matsuda et al. |
| 7,257,339 B2 | 8/2007 | Yokoyama et al. |
| 7,277,664 B2 | 10/2007 | Katsuyama et al. |
| 7,327,962 B2 | 2/2008 | Shoji et al. |
| 7,327,972 B2 | 2/2008 | Matsuda et al. |
| 7,343,119 B2 | 3/2008 | Matsuda et al. |
| 7,343,126 B2 | 3/2008 | Miyawaki et al. |
| 7,346,286 B2 | 3/2008 | Matsumoto et al. |
| 7,356,288 B2 | 4/2008 | Iwata et al. |
| 7,376,375 B2 | 5/2008 | Kobayashi et al. |
| 7,386,262 B2 | 6/2008 | Okamura et al. |
| 7,444,097 B2 | 10/2008 | Suzuki et al. |
| 7,444,107 B2 | 10/2008 | Takeuchi et al. |
| 7,454,150 B2 | 11/2008 | Matsuda et al. |
| 7,457,550 B2 | 11/2008 | Shoji et al. |
| 7,509,074 B2 | 3/2009 | Yokoyama et al. |
| 7,512,364 B2 | 3/2009 | Muramatsu et al. |
| 7,536,139 B2 | 5/2009 | Katsuyama et al. |
| 7,542,697 B2 | 6/2009 | Matsumoto et al. |
| 7,542,703 B2 | 6/2009 | Kasahara et al. |
| 7,551,882 B2 | 6/2009 | Seto et al. |
| 7,554,574 B2 | 6/2009 | Shoji et al. |
| 7,587,157 B2 | 9/2009 | Matsuda et al. |
| 7,593,674 B2 | 9/2009 | Matsumoto et al. |
| 7,603,054 B2 | 10/2009 | Katsuyama et al. |
| 7,636,536 B2 | 12/2009 | Iwata et al. |
| 7,643,767 B2 | 1/2010 | Seto et al. |
| 7,684,740 B2 | 3/2010 | Matsuda et al. |
| 7,693,466 B2 | 4/2010 | Miyawaki et al. |
| 7,711,300 B2 | 5/2010 | Nakafuji et al. |
| 7,711,301 B2 | 5/2010 | Takemoto et al. |
| 7,729,642 B2 | 6/2010 | Matsumoto et al. |
| 7,738,813 B2 | 6/2010 | Yasutomi et al. |
| 7,751,746 B2 | 7/2010 | Miyawaki et al. |
| 7,778,555 B2 | 8/2010 | Shoji et al. |
| 7,778,577 B2 | 8/2010 | Muramatsu et al. |
| 7,783,233 B2 | 8/2010 | Iwata et al. |
| 7,790,343 B2 | 9/2010 | Suzuki et al. |
| 7,792,472 B2 | 9/2010 | Ichikawa et al. |
| 7,796,914 B2 | 9/2010 | Matsumoto et al. |
| 7,809,322 B2 | 10/2010 | Takeuchi et al. |
| 7,822,351 B2 | 10/2010 | Aoki et al. |
| 7,831,185 B2 | 11/2010 | Masubuchi et al. |
| 7,835,653 B2 | 11/2010 | Katoh et al. |
| 7,871,073 B2 | 1/2011 | Noguchi et al. |
| 7,885,587 B2 | 2/2011 | Matsuda et al. |
| 2001/0052526 A1 | 12/2001 | Kasahara et al. |
| 2002/0025195 A1 | 2/2002 | Iwata et al. |
| 2002/0031379 A1 | 3/2002 | Miyawaki et al. |
| 2002/0044799 A1 | 4/2002 | Sasamoto et al. |
| 2003/0185602 A1 | 10/2003 | Sasamoto et al. |
| 2003/0235436 A1 | 12/2003 | Kasahara et al. |
| 2004/0013442 A1 | 1/2004 | Suzuki et al. |
| 2004/0057059 A1 | 3/2004 | Miura et al. |
| 2004/0086299 A1 | 5/2004 | Matsuda et al. |
| 2004/0131392 A1 | 7/2004 | Matsumoto et al. |
| 2004/0161261 A1 | 8/2004 | Kasahara et al. |
| 2004/0164691 A1 | 8/2004 | Andoh et al. |
| 2004/0179869 A1 | 9/2004 | Miyawaki et al. |
| 2004/0213605 A1 | 10/2004 | Sasamoto et al. |
| 2005/0002054 A1 | 1/2005 | Shoji et al. |
| 2005/0053388 A1 | 3/2005 | Yokoyama et al. |
| 2005/0089347 A1 | 4/2005 | Muramatsu et al. |
| 2005/0095037 A1 | 5/2005 | Koike et al. |
| 2005/0100374 A1 | 5/2005 | Satoh et al. |
| 2005/0154562 A1 | 7/2005 | Matsuura et al. |
| 2005/0157327 A1 | 7/2005 | Shoji et al. |
| 2005/0163537 A1 | 7/2005 | Muramatsu et al. |
| 2005/0226655 A1 | 10/2005 | Katsuyama et al. |
| 2005/0244197 A1 | 11/2005 | Sasamoto et al. |
| 2005/0249524 A1 | 11/2005 | Matsuda et al. |
| 2005/0265759 A1 | 12/2005 | Takeuchi et al. |
| 2005/0281596 A1 | 12/2005 | Nakagawa et al. |
| 2005/0286916 A1 | 12/2005 | Nakazato et al. |
| 2006/0008281 A1 | 1/2006 | Matsumoto et al. |
| 2006/0088338 A1 | 4/2006 | Matsuda et al. |
| 2006/0110189 A1 | 5/2006 | Matsuda et al. |
| 2006/0133873 A1 | 6/2006 | Andoh et al. |
| 2006/0140679 A1 | 6/2006 | Iwata et al. |
| 2006/0153604 A1 | 7/2006 | Matsuda et al. |
| 2006/0165442 A1 | 7/2006 | Kobayashi et al. |
| 2006/0182451 A1 | 8/2006 | Shoji et al. |
| 2006/0182471 A1 | 8/2006 | Okamura et al. |
| 2006/0184258 A1 | 8/2006 | Matsuda et al. |
| 2006/0275056 A1 | 12/2006 | Matsuda et al. |
| 2007/0008395 A1 | 1/2007 | Masubuchi et al. |
| 2007/0009289 A1 | 1/2007 | Muramatsu et al. |
| 2007/0053721 A1 | 3/2007 | Matsumoto et al. |
| 2007/0053723 A1 | 3/2007 | Iwata et al. |
| 2007/0126837 A1 | 6/2007 | Takahashi et al. |
| 2007/0127934 A1 | 6/2007 | Shoji et al. |
| 2007/0140728 A1 | 6/2007 | Miyawaki et al. |
| 2007/0154242 A1 | 7/2007 | Matsumoto et al. |
| 2007/0166079 A1 | 7/2007 | Ichikawa et al. |
| 2007/0172257 A1 | 7/2007 | Matsuda et al. |
| 2007/0189813 A1 | 8/2007 | Matsumoto et al. |
| 2007/0212126 A1 | 9/2007 | Seto et al. |
| 2007/0212129 A1 | 9/2007 | Takemoto et al. |
| 2007/0218386 A1 | 9/2007 | Suzuki et al. |
| 2007/0231022 A1 | 10/2007 | Yokoyama et al. |
| 2007/0264053 A1 | 11/2007 | Iwata et al. |
| 2007/0274740 A1 | 11/2007 | Katoh et al. |
| 2008/0008505 A1 | 1/2008 | Seto et al. |
| 2008/0013972 A1 | 1/2008 | Matsuda |
| 2008/0038019 A1 | 2/2008 | Kasahara et al. |
| 2008/0069596 A1 | 3/2008 | Katsuyama et al. |
| 2008/0069610 A1 | 3/2008 | Nakafuji et al. |
| 2008/0118275 A1 | 5/2008 | Yasutomi et al. |
| 2008/0152380 A1 | 6/2008 | Matsumoto et al. |
| 2008/0170884 A1 | 7/2008 | Matsuda |
| 2008/0175612 A1 | 7/2008 | Oikawa et al. |
| 2008/0212998 A1 | 9/2008 | Miyawaki et al. |
| 2008/0219702 A1 | 9/2008 | Tsukamoto et al. |
| 2008/0226349 A1 | 9/2008 | Iwata et al. |
| 2008/0232880 A1 | 9/2008 | Noguchi et al. |
| 2008/0261768 A1 | 10/2008 | Miyawaki et al. |
| 2008/0298844 A1 | 12/2008 | Katoh et al. |
| 2008/0298845 A1 | 12/2008 | Ohmura et al. |
| 2008/0298866 A1 | 12/2008 | Matsumoto et al. |
| 2008/0303202 A1 | 12/2008 | Noguchi et al. |
| 2008/0310884 A1 | 12/2008 | Matsumoto et al. |

(56) References Cited

U.S. PATENT DOCUMENTS

| | | |
|---|---|---|
| 2009/0003904 A1 | 1/2009 | Yasutomi et al. |
| 2009/0017953 A1* | 1/2009 | Uehara et al. ............... 475/149 |
| 2009/0026689 A1 | 1/2009 | Noguchi et al. |
| 2009/0028611 A1 | 1/2009 | Matsumoto et al. |
| 2009/0041520 A1 | 2/2009 | Takeuchi et al. |
| 2009/0052912 A1 | 2/2009 | Soji et al. |
| 2009/0074431 A1 | 3/2009 | Aoki et al. |
| 2009/0080945 A1 | 3/2009 | Muramatsu et al. |
| 2009/0123174 A1 | 5/2009 | Iwata et al. |
| 2009/0129811 A1 | 5/2009 | Katsuyama et al. |
| 2009/0169225 A1 | 7/2009 | Murata et al. |
| 2009/0169264 A1 | 7/2009 | Miyoshi et al. |
| 2009/0185832 A1 | 7/2009 | Muramatsu et al. |
| 2009/0190972 A1 | 7/2009 | Ohkubo et al. |
| 2009/0207461 A1 | 8/2009 | Hodoshima et al. |
| 2009/0220277 A1 | 9/2009 | Andoh et al. |
| 2009/0232558 A1 | 9/2009 | Kudo et al. |
| 2009/0238588 A1 | 9/2009 | Matsuda et al. |
| 2009/0238613 A1 | 9/2009 | Ueda et al. |
| 2009/0263158 A1 | 10/2009 | Murata et al. |
| 2009/0317106 A1 | 12/2009 | Ohmura et al. |
| 2009/0322020 A1 | 12/2009 | Iwata et al. |
| 2009/0324262 A1 | 12/2009 | Matsuda et al. |
| 2009/0324298 A1 | 12/2009 | Katsuyama et al. |
| 2010/0017019 A1 | 1/2010 | Andoh et al. |
| 2010/0061774 A1 | 3/2010 | Iwata et al. |
| 2010/0290815 A1 | 11/2010 | Ichikawa et al. |
| 2010/0323836 A1* | 12/2010 | Wang et al. ...................... 475/1 |
| 2011/0293328 A1* | 12/2011 | Matsuda et al. ............. 399/167 |
| 2012/0046142 A1* | 2/2012 | Miyawaki et al. ........... 475/331 |
| 2012/0196720 A1* | 8/2012 | Miyawaki et al. ........... 475/345 |

* cited by examiner

DRIVING DEVICE AND IMAGE FORMING APPARATUS

CROSS-REFERENCE TO RELATED APPLICATIONS

The present application claims priority to and incorporates by reference the entire contents of Japanese Patent Application No. 2010-063100 filed in Japan on Mar. 18, 2010.

BACKGROUND OF THE INVENTION

1. Field of the Invention

The present invention relates to a driving device and an image forming apparatus, and in particular to a positioning mechanism that positions a rotating shaft on an input side and a rotating shaft on an output side in a deceleration mechanism used for a transmission path of driving force.

2. Description of the Related Art

As is well known, in an image forming apparatus, such as a copying machine, a printer, and a printing machine, an electrostatic latent image formed on a photosensitive drum serving as a latent image carrier is developed into a visible image with developer supplied from a developing unit. The image thus developed into the visible image is transferred and fixed onto a recording sheet or the like, whereby a copy output operation is performed.

The latent image carrier is a member used for forming an image with a plurality of colors as well as a single color. When images of a plurality of colors are superimposed, for example, by a tandem electrophotographic process in which a plurality of latent image carriers are arranged along the moving direction of a transfer body, operational timings for forming the images of the colors need to be matched.

The operational timings not being matched cause an abnormal image such as color deviation.

Conventionally, a mechanism that drives a latent image carrier is configured to cause a deceleration mechanism to decelerate driving force of a driving motor and to transmit the driving force to the latent image carrier. An example of the mechanism include a configuration in which a planetary gear mechanism whose input shaft is an output shaft of a driving motor is used as a deceleration mechanism (for example, Japanese Patent No. 4360162).

Japanese Patent No. 4360162 discloses the following structure.

Specifically, FIG. 12 is a schematic of a structure disclosed in Japanese Patent No. 4360162. In FIG. 12, an output shaft D is provided to a carrier C that rotates while supporting a plurality of planetary gears P that revolve around a sun gear S supported by an output shaft M1 of a driving motor M. The output shaft D is rotatably supported by a shaft bearing U fixed to a decelerator case K that houses therein the planetary gear mechanism. In this structure, the output shaft of the driving motor M corresponds to a rotating shaft on the input side, and the output shaft D provided to the carrier C corresponds to a rotating shaft on the output side. In FIG. 12, K1 denotes internal teeth engaged with the planetary gears P arranged on the inner surface of the decelerator case.

A latent image carrier is a member that needs to be replaced when its photosensitive layer deteriorates over time.

Conventionally, so as to make a latent image carrier replaceable, a structure in which an output shaft of such a deceleration mechanism disclosed in Japanese Patent No. 4360162 is coupled to a photosensitive drum via a coupling to make the photosensitive drum detachable has been developed (for example, Japanese Patent Application Laid-open No. 2001-200858).

As for structures embodying the engaging relationship between the output shaft integrated with the carrier of the deceleration mechanism and the latent image carrier, Japanese Patent No. 4360162 employs the structure in which the output shaft itself is extended to be supported by the latent image carrier, and Japanese Patent Application Laid-open No. 2001-200858 employs the structure in which the output shaft is coupled to the shaft of the latent image carrier via the coupling.

In both structures, however, the length of the output shaft is made large, resulting in an increase in the space occupied by the deceleration mechanism adjacent to the latent image carrier.

To address this problem, a structure in which a deceleration mechanism is housed in a latent image carrier, and a driving motor is arranged outside of the latent image carrier has been developed (for example, Japanese Patent Application Laid-open No. 2004-219836). With this structure, the space occupied by the deceleration mechanism in the axial direction of the output shaft extending from the driving motor to the latent image carrier can be made small.

In each of the structures disclosed in Japanese Patent No. 4360162, Japanese Patent Application Laid-open No. 2001-200858, and Japanese Patent Application Laid-open No. 2004-219836, because the output shaft of the deceleration mechanism that houses the gears in the housing is used as the drive shaft of the latent image carrier, the deceleration mechanism needs to be connected precisely to the latent image carrier. As a result, the yield of processing the deceleration mechanism remains low, thereby increasing the operating cost and parts management cost.

By contrast, in the driving device itself using the deceleration mechanism, the structure of the output shaft is changed depending on the size of the latent image carrier to be used. The part management for the deceleration mechanism itself that houses the gears in the housing is required in accordance with changes in specifications, whereby the management cost may be increased. In addition, for the maintenance of the deceleration mechanism, the deceleration mechanism itself attached to the driving unit of the latent image carrier needs to be removed. As a result, operations required for the maintenance are made complicated.

SUMMARY OF THE INVENTION

It is an object of the present invention to at least partially solve the problems in the conventional technology.

According to an aspect of the present invention, there is provided a driving device including a planetary gear deceleration mechanism in a transmission path that transmits driving force from a driving motor to a driven member, wherein the deceleration mechanism includes a first support unit and a second support unit into which a housing that constitutes a mechanism main body is divided, the first support unit includes a carrier of at least one stage and a pinion gear supported thereby, and is provided with an output unit in a carrier of a final stage, the second support unit includes an output shaft that is detachable from the output unit and a supporting unit for the output shaft, and the output shaft is supported in an insertable and removable manner with respect to the output unit of the carrier in the first support unit and the second support unit that are joined to each other.

According to another aspect of the present invention, there is provided an image forming apparatus including a driving device having a planetary gear deceleration mechanism in a transmission path that transmits driving force from a driving motor to a driven member, wherein the deceleration mechanism includes a first support unit and a second support unit into which a housing that constitutes a mechanism main body is divided, the first support unit includes a carrier of at least one stage and a pinion gear supported thereby, and is provided with an output unit in a carrier of a final stage, the second support unit includes an output shaft that is detachable from the output unit and a supporting unit for the output shaft, and the output shaft is supported in an insertable and removable manner with respect to the output unit of the carrier in the first support unit and the second support unit that are joined to each other, and wherein a latent image carrier is supported detachably by the output shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are described below with reference to the accompanying drawings.

Figure 1:
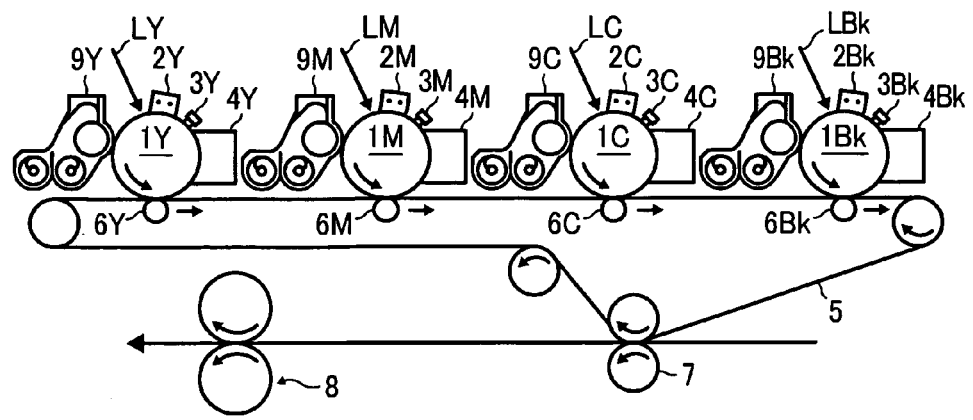
FIG. 1 is an external view of an example of an image forming apparatus to which a latent image carrier serving as a driven member provided with a driving device according to the present invention is applied.

FIG. 1 is a schematic of an image forming apparatus including a latent image carrier serving as a driven member driven by a driving device according to the present invention.

FIG. 1 is a schematic of an electrophotography color copying machine using a tandem electrophotographic process. In the copying machine, an electrostatic latent image is developed into a visible image by two-component development using dry two-component developer. The embodiments of the present invention are applied to the copying machine. However, the present invention is not limited thereto, and can be applied to printers, facsimile apparatuses, printing machines, or multifunction peripherals (MFP) combining these functions as well.

The copying machine illustrated in FIG. 1 receives image data, which is image information, from an image scanning unit not illustrated, and performs image forming processing. In the copying machine, as illustrated in FIG. 1, as for four rotating bodies for each of the colors of yellow (hereinafter, simply referred to as "Y"), magenta (hereinafter, simply referred to as "M"), cyan (hereinafter, simply referred to as "C"), and black (hereinafter, simply referred to as "Bk"), photosensitive drums 1Y, 1M, 1C, and 1Bk serving as latent image carriers are arranged. The photosensitive drums 1Y, 1M, 1C, and 1Bk are arranged in a manner kept in contact with an intermediate transfer belt 5 having an endless belt shape supported by a plurality of rotatable rollers that include a driving roller along the moving direction of the belt.

Around the photosensitive drums 1Y, 1M, 1C, and 1Bk, members for electrophotography processing including charging units 2Y, 2M, 2C, and 2Bk, developing units for each of the colors 9Y, 9M, 9C, and 9Bk, cleaning devices 4Y, 4M, 4C, and 4Bk, and neutralization lamps 3Y, 3M, 3C, and 3Bk, respectively, are arranged in order of processing.

When a full-color image is formed in the copying machine according to the embodiment, the photosensitive drum 1Y is uniformly charged by the charging unit 2Y while being driven to rotate by a photosensitive drum driving unit, which will be described later, in the direction of the arrows illustrated in FIG. 1. Subsequently, a light beam LY output from an optical writing device, which is not illustrated, is irradiated to form a Y electrostatic latent image on the photosensitive drum 1Y.

The developing unit 9Y develops the Y electrostatic latent image using a Y toner in the developer. While the Y electrostatic latent image is developed, a predetermined developing bias is applied between a developing roller and the photosensitive drum 1Y, and the Y toner on the developing roller is electrostatically adsorbed on the Y electrostatic latent image on the photosensitive drum 1Y.

The Y toner image thus developed and formed is conveyed to a primary transfer position where the photosensitive drum 1Y is kept in contact with the intermediate transfer belt 5 by the rotation of the photosensitive drum 1Y. At the primary transfer position, a predetermined bias voltage is applied to the back surface of the intermediate transfer belt 5 by a primary transfer roller 6Y. A primary transfer electrical field generated by the application of the bias attracts the Y toner image on the photosensitive drum 1Y toward the intermediate transfer belt 5, whereby the Y toner image is primarily transferred onto the intermediate transfer belt 5.

In the same manner as this, an M toner image, a C toner image, and a Bk toner image are also primarily transferred to be superimposed onto the Y toner image on the intermediate transfer belt 5 in order.

The four-color superimposed toner image on the intermediate transfer belt 5 is conveyed to a secondary transfer position facing a secondary transfer roller 7 by the rotation of the intermediate transfer belt 5. Registration rollers, which are not illustrated, convey a transfer sheet to the secondary transfer position at a predetermined operational timing. At the secondary transfer position, a predetermined bias voltage is applied to the back surface of the transfer sheet by the secondary transfer roller 7. By a secondary transfer electrical field generated by the application of the bias and the contact pressure at the secondary transfer position, the toner image on the intermediate transfer belt 5 is altogether secondarily transferred onto the transfer sheet. Subsequently, the transfer sheet with the toner image secondarily transferred thereon is applied with a fixing process by a pair of fixing rollers 8, and then discharged to the outside of the apparatus.

The characteristics of the present invention applied to an image forming apparatus having such a structure described above are explained as follows.

The present invention has its characteristics in a driving device by which a photosensitive drum is driven, and specifically in a structure of a planetary gear deceleration mechanism used for the driving device.

More specifically, the planetary gear deceleration mechanism is composed of first and second support units into which a housing is divided. The planetary gear deceleration mechanism is composed of the first support unit including a carrier of at least one stage and a pinion supported thereby, and provided with an output unit in a carrier of the final stage, and of the second support unit including an output shaft that is detachable from the output unit and a supporting unit for the output shaft. The output shaft is supported in an insertable and removable manner with respect to the output unit in the units that include a positioning unit for positioning the units in at least one direction of the thrust direction and the radial direction at the portion in which the units are joined to each other. A first embodiment of the present invention will be described below in greater detail.

Figure 2A:
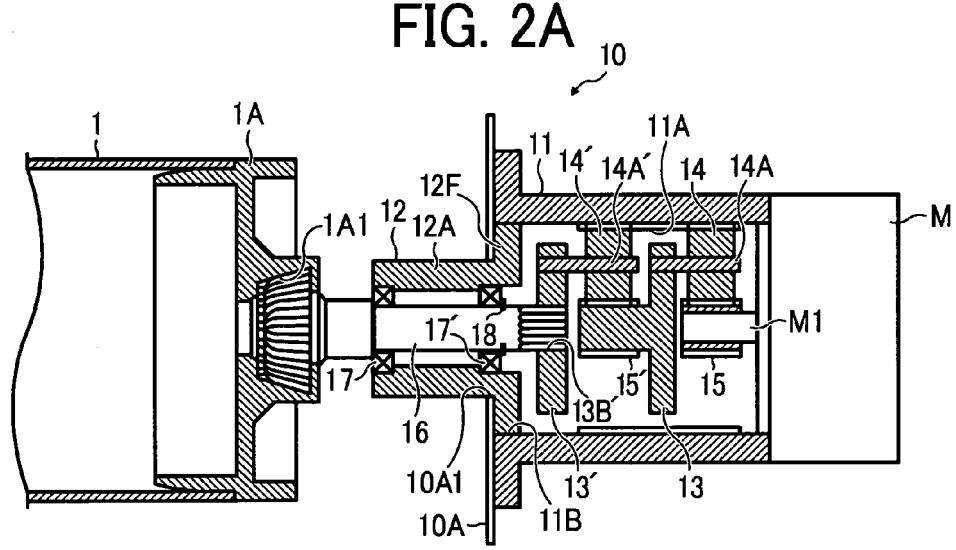
FIGS. 2A and 2B are schematics of main part structures of a driving device according to a first embodiment of the present invention.

FIG. 2A is a schematic of a drum driving device by which a photosensitive drum is driven. In a drum driving device 10 in FIGS. 2A and 2B, a housing can be divided into a first support unit 11 and a second support unit 12.

The first support unit 11 includes a rotatable carrier of at least one stage and a pinion serving as a planetary gear supported by the carrier in a revolvable manner in the support unit 11. The structure illustrated in FIGS. 2A and 2B includes carriers 13 and 13' of two stages and pinions 14 and 14'.

The number of stages is set so as to provide a required reduction ratio. In the first embodiment, reduction ratios from one tenth to one hundredth can be provided depending on the number of stages.

The carrier 13 of the first stage and the pinion 14 are arranged in the following relationship. The pinion 14 meshes with a sun gear 15 that is attached to an output shaft M1 of a driving motor M arranged on the input side in a power transmission path and internal teeth 11A of the first support unit 11. The carrier 13 rotating with a reduction ratio determined by the gear ratio between the internal teeth 11A, the sun gear 15, and the pinion 14 supports the pinion 14 with a supporting pin 14A in a revolvable manner along the internal teeth 11A.

The carrier 13' of the second stage and the pinion 14' are arranged as follows. The pinion 14' is arranged to mesh with a sun gear 15' of the second stage provided to the carrier 13 of the first stage. The pinion 14' is rotatably supported by a supporting pin 14A' provided to the carrier 13' of the final stage in a revolvable manner along the internal teeth 11A.

Figure 3:
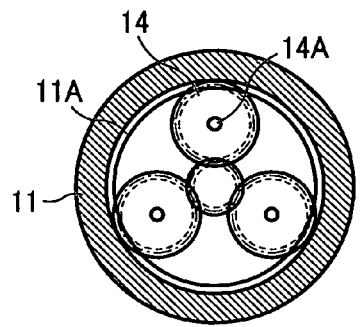
FIG. 3 is a front view of the main part structure illustrated in FIGS. 2A and 2B.

As illustrated in FIG. 3, the pinions 14 and 14' are arranged and supported in trisected positions along the circumferential direction of the carriers 13 and 13'.

The carrier 13' of the final stage includes an output unit 13B' by which a photosensitive drum shaft 16 is supported in a detachable manner with a spline engagement opening. The output unit 13B' provided to the carrier 13' of the final stage is supported in a floating manner.

By contrast, the second support unit 12 includes the photosensitive drum shaft 16 having one end that is insertable and removable into and from the output unit 13B' of the carrier 13' of the final stage included in the first support unit 11 in the axial direction, and shaft bearings 17 and 17' arranged at a plurality of positions along the axial direction of the drum shaft 16.

Figure 2B:
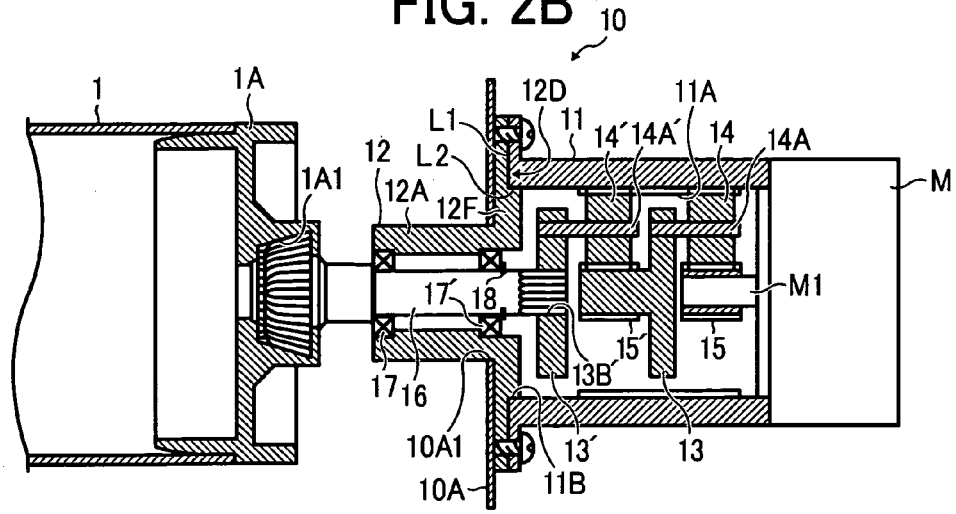

The shaft bearing 17 of the shaft bearings 17 and 17' is arranged at one end of the second support unit in the axial direction, and the shaft bearing 17' is arranged at a position corresponding to an insertion supporting opening 10A1 of a supporting wall 10A, which will be described later. In FIGS. 2A and 2B, reference numeral 18 denotes a retaining ring, that is, a so-called E ring.

The first and the second support units 11 and 12 are fixed to the supporting wall 10A included in the device main body. A structure for positioning the axes of the shaft on the input side and the axis of the shaft on the output side in the deceleration mechanism is used.

More specifically, the first support unit 11 is structured to allow the second support unit 12 to fit into an end opening 11B of the first support unit 11. The second support unit 12 is structured to allow a boss unit 12A through which the photosensitive drum shaft 16 is inserted to insert into the insertion supporting opening 10A1 provided to the supporting wall 10A included in the device main body.

The boss unit 12A of the second support unit 12 has a flange 12F that can come into contact with the inner surface of the end opening 11B provided to the first support unit 11.

In the second support unit 12, the flange 12F is inserted into the insertion supporting opening 10A1 of the supporting wall 10A to come into contact with the inner surface of the end opening 11B of the first support unit 11. This makes it possible to position the first and the second support units 11 and 12 in at least one direction of the thrust direction and the radial direction.

In the structure illustrated in FIGS. 2A and 2B, the misalignment in the thrust direction is prevented by the inner surface of the supporting wall 10A, and the misalignment in the radial direction is prevented by inserting the second support unit 12 into the first support unit 11.

In this manner, the first and the second support units 11 and 12 are nearly integrated by causing the flange 12F to come into contact with the inner surface of the end opening 11B of the first support unit 11 with reference to the insertion supporting opening 10A1 of the supporting wall 10A into which the boss unit 12A of the second support unit 12 is inserted. Therefore, the axis on the input side, that is, the axis of the motor shaft M1 and the axis on the output side corresponding to the output unit 13B' are positioned so as to coincide with each other in the planetary gear mechanism.

By contrast, the photosensitive drum shaft 16 that is insertable and removable into and from the output unit 13B' of the carrier 13' of the final stage is rotatably supported by the shaft bearings 17 and 17' arranged along the axial direction in the boss unit 12A of the second support unit 12. The distance between the shaft bearings is set as appropriate to prevent high bending stress from occurring in the photosensitive drum shaft 16, thereby removing the cause of axial runout. In particular, by arranging one of the shaft bearings at a position corresponding to the inner circumferential surface of the insertion supporting opening 10A1 of the supporting wall 10A, the supporting drag of the photosensitive drum shaft 16 can be enhanced using the inner circumferential surface of the insertion supporting opening as a receiving portion.

By arranging the photosensitive drum shaft 16 in a manner supported by the shaft bearings 17 and 17' in the second support unit 12, as described above, the photosensitive drum shaft 16 is integrated with the output unit 13B' of the carrier 13' of the final stage whose axis position coincides with the axis position on the input side in the planetary gear mechanism. Therefore, the axis of the photosensitive drum shaft 16 coincides with the axis on the input side.

The photosensitive drum shaft 16 can rotate integrally with the output unit 13B' provided to the carrier 13' by spline engagement. Because the axis positions on the input side and the output side coincide with each other, the photosensitive drum shaft 16 can rotate without causing vibrations such as axial runout.

The other end of the photosensitive drum shaft 16 in the axial direction is provided with a serration coupling of a tapered shape. The serration coupling is inserted into a concave portion 1A1 of the serration coupling formed on an end plate 1A of the photosensitive drum (represented by reference numeral 1 indicated in FIG. 1 for convenience) that is a driven member, and allowed to rotate integrally with the photosensitive drum 1.

Figure 4:
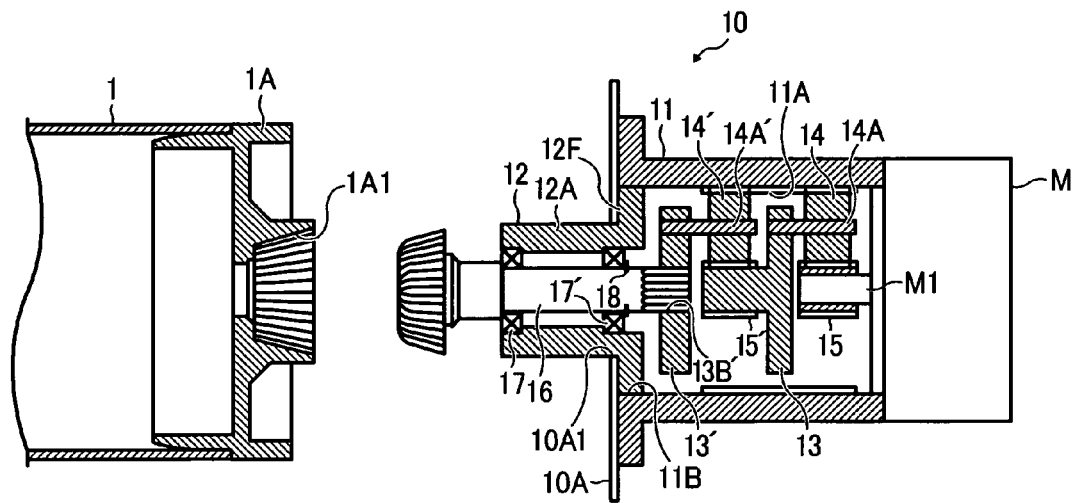
FIG. 4 is an aspect of the main part structure illustrated in FIGS. 2A and 2B.

FIG. 4 is a schematic of the photosensitive drum 1 prior to being fitted to the photosensitive drum shaft 16. In this state, by fitting the end plate 1A of the photosensitive drum 1 to the photosensitive drum shaft 16 protruding outside from the boss unit 12A of the second support unit 12, the photosensitive drum 1 is integrated with the photosensitive drum shaft 16 via the serration coupling.

As described above, because the axes on the input side and the output side coincide with each other in the planetary gear mechanism, the axis of the photosensitive drum 1 engaged with the photosensitive drum shaft 16 corresponding to the output side also coincides with the axis on the input side. In this manner, the photosensitive drum 1 can be prevented from rotating eccentrically because of a misalignment in the axis.

Figure 5:
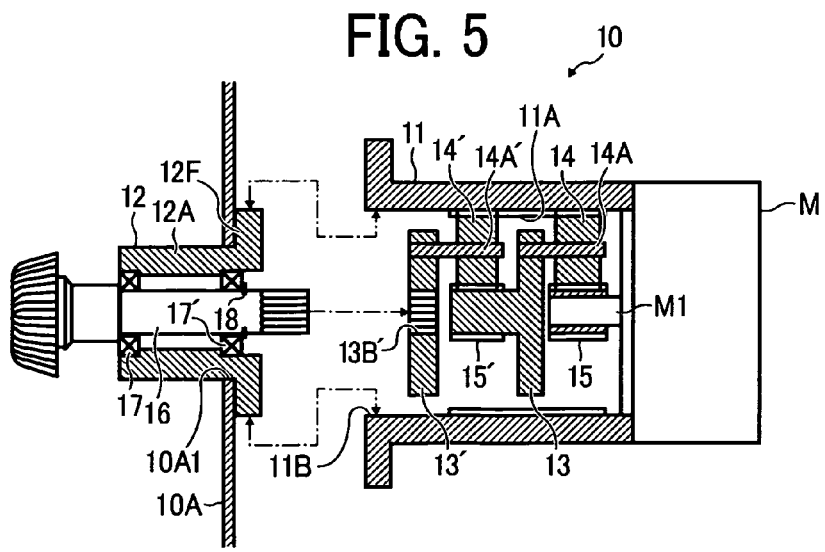
FIG. 5 is another aspect of the main part structure illustrated in FIGS. 2A and 2B.

On the contrary, FIG. 5 is a schematic of the first and the second support units prior to being integrated with each other, and in particular, is a schematic of the first support unit 11 prior to being fitted to the supporting wall 10A to which the second support unit 12 is fixed.

In this state, by fixing the first support unit 11 to the supporting wall 10A with the second support unit 12 fitted into the end opening 11B, the center of the cross section of the second support unit 12, that is, the axis position coincides with the axis position of the first support unit 11. Accordingly, both support units are fixed in a state where the axes on the input side and the output side coincide with each other in the planetary gear mechanism.

Figure 6:
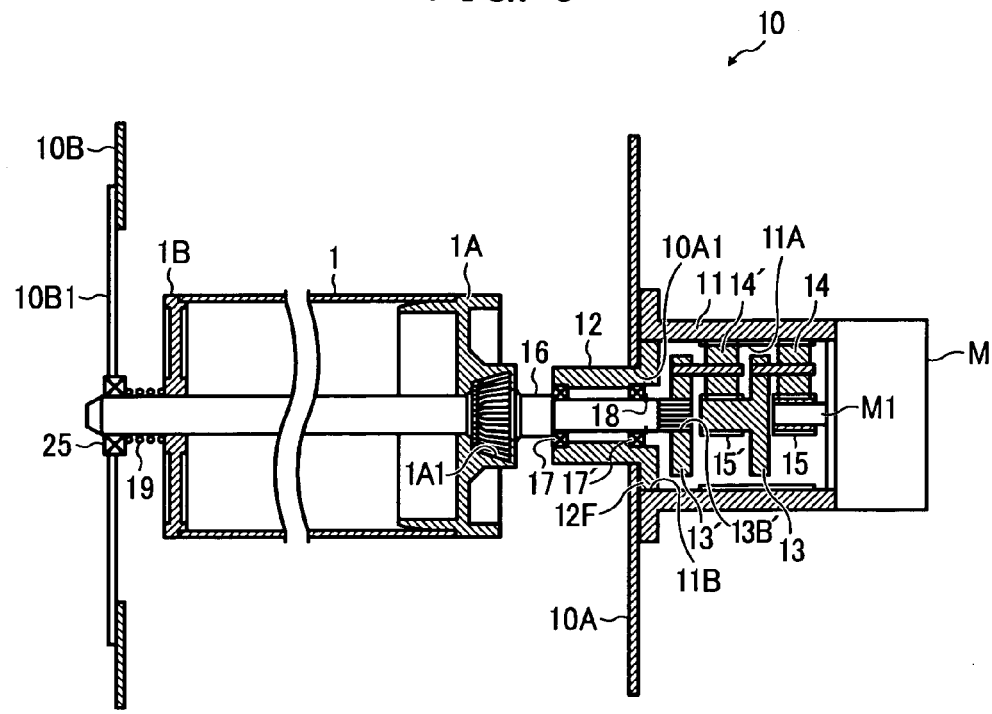
FIG. 6 is a schematic for explaining a relationship between the main part structure illustrated in FIGS. 2A and 2B and a driven member.

FIG. 6 is a schematic of the photosensitive drum 1 being coupled to the photosensitive drum shaft 16 via the serration coupling.

In the photosensitive drum 1 in FIG. 6, the end plate 1A positioned on one side in the axial direction is coupled to the photosensitive drum shaft 16, whereas a shaft on the other side in the axial direction is supported via a shaft bearing 25 with respect to a face plate 10B1 provided to another supporting wall 10B included in the device. The face plate 10B1 is structured detachably from the supporting wall 10B, and can be removed when the photosensitive drum 1 is removed.

A spring 19 is arranged between the face plate 10B1 and an end portion 1B of the photosensitive drum 1 on the other side in the axial direction to maintain serration coupling between the photosensitive drum 1 and the photosensitive drum shaft 16.

In the first embodiment described above, because the photosensitive drum shaft 16 can be inserted and removed in the planetary gear deceleration mechanism, the housing itself does not need to be removed for replacement of the parts or a maintenance operation. Therefore, operations can be performed on the units that require replacement or maintenance individually, thereby improving the operating efficiency.

In addition, because the units can be managed in accordance with changes in the specifications of the device, a design change of the entire housing due to the parts management or the change in the specifications is not required, thereby preventing the management cost from increasing.

The design change due to the change in the specifications herein means, for example, a situation where the size of the outside diameter of the photosensitive drum shaft 16 is changed. In this situation, by preparing a second support unit fitted to the diameter, the second support unit can be incorporated as one part of the housing. Therefore, cost reduction can be achieved compared with the situation where an entire housing is newly prepared.

A second embodiment according to the present invention will now be described.

The second embodiment has its characteristics in a positioning mechanism for the first and the second support units in the thrust direction and the radial direction, and an aligning function.

Figure 7:
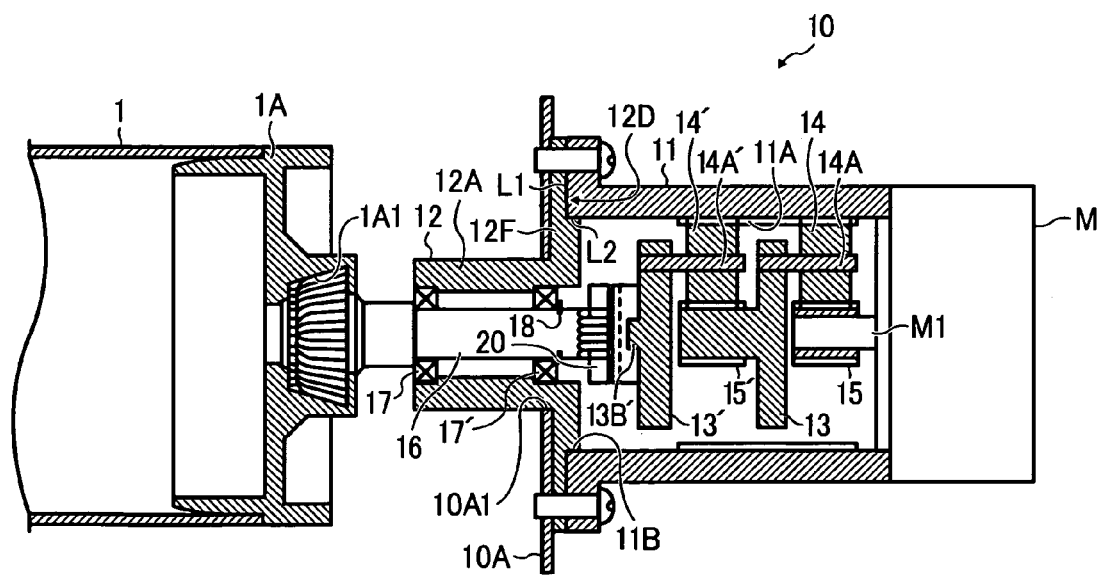
FIG. 7 is a schematic of a main part structure of a driving device according to a second embodiment of the present invention.

FIG. 7 is a schematic of a drum driving device according to the second embodiment. In FIG. 7, members similar to those illustrated in FIGS. 2A and 2B are represented by similar reference numerals.

In FIG. 7, an end portion of the first support unit 11 and an end portion of the second support unit 12 each facing the supporting wall 10A are stacked. In other words, a concave portion 12D including right-angled side portions L1 and L2 is formed in the second support unit 12 near the end on the supporting wall 10A side. The end of the first support unit 11 on the supporting wall 10A side is mounted on the concave portion 12D. The inner surface of the end opening 11B of the first support unit 11 is fitted onto one of the right-angled side portions along the axial direction, that is, the side portion L2 along the horizontal direction in the second embodiment.

The first and the second support units 11 and 12 are stacked with the end of the first support unit 11 mounted on the concave portion 12D. Therefore, by fastening the portion to the supporting wall 10A, the first and the second support units 11 and 12 are integrally supported with respect to the supporting wall 10A.

The concave portion 12D includes the side portions L1 and L2 at right angles to each other. Therefore, by arranging the inner surface of the end opening 11B of the first support unit 11 on the side portion L2 along the axial direction included in the concave portion 12D, the misalignment in the radial direction is prevented. By arranging the end surface of the end opening 11B of the first support unit 11 on the side portion L1 along the longitudinal direction perpendicular to the axial direction included in the concave portion 12D, the misalignment in the thrust direction is prevented.

In this manner, by fastening the flange 12F of the second support unit 12 and the first support unit 11 altogether to the supporting wall 10A, the units are integrated while the misalignment in the thrust direction and the radial direction is prevented. Accordingly, the misalignment in any one or both the thrust direction and the radial direction is prevented, whereby the axis positions on the input side and the output side in the planetary gear mechanism included in the units can be kept coinciding with each other.

By contrast, an Oldham's coupling 20 having a spline engagement portion is provided to the output unit 13B' included in the carrier 13' of the final stage to perform an aligning function. The Oldham's coupling 20 is fitted and fixed into a convex portion formed at a position corresponding to the output unit 13B' of the carrier 13'.

Figure 8:
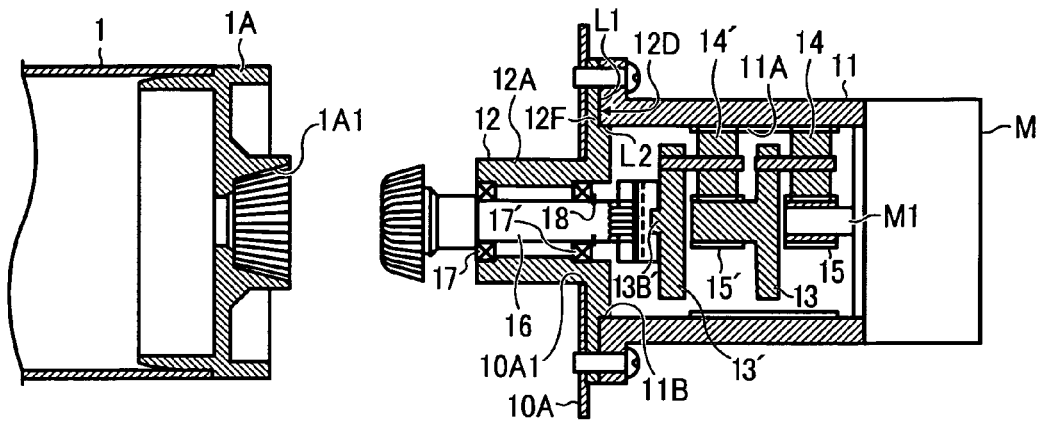
FIG. 8 is a schematic of an aspect of a main part structure illustrated in FIG. 7.
Figure 9:
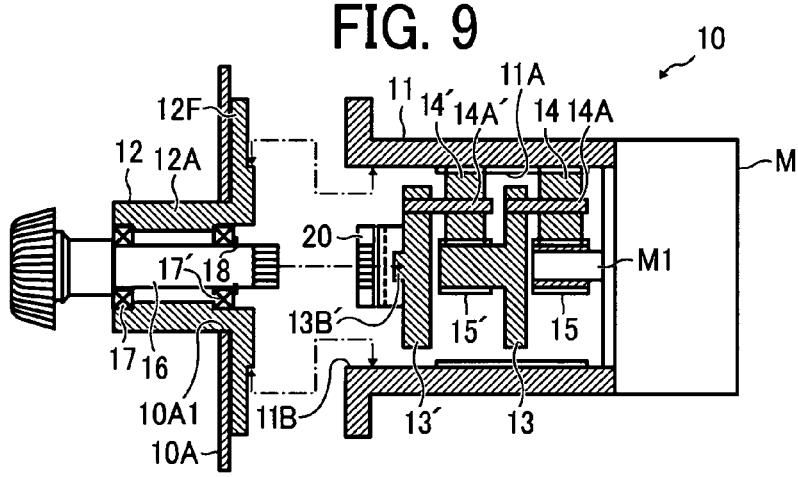
FIG. 9 is a schematic of another aspect of the main part structure illustrated in FIG. 7.
Figure 10:
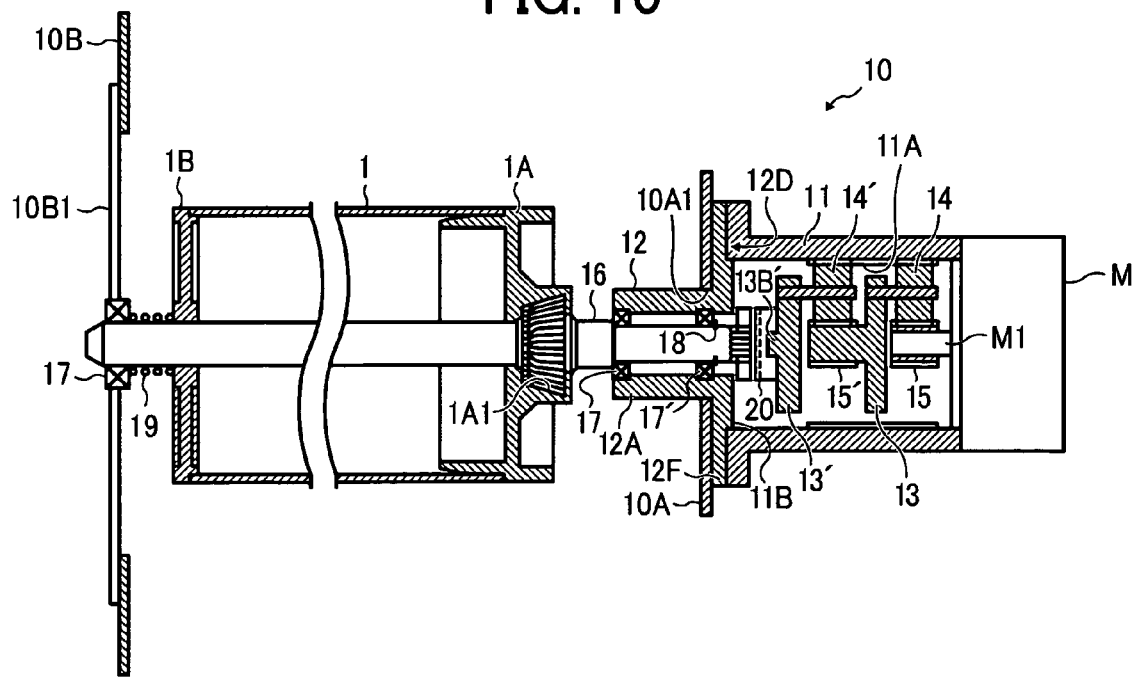
FIG. 10 is a schematic for explaining a relationship between the main part structure illustrated in FIG. 7 and a driven member.

FIG. 8, which is a schematic corresponding to FIG. 4, is a schematic of the photosensitive drum 1 and the drum driving device having the structure illustrated in FIG. 7 prior to being integrated with each other. FIG. 9 is a schematic corresponding to FIG. 5, and FIG. 10 is a schematic corresponding to FIG. 6.

As is clear in FIGS. 7 to 10, in the second embodiment, because the first and the second support units are integrated with parts of the joining portion thereof stacked, the axis positions on the input side and the output side in the planetary gear mechanism included in the units coincide with each other.

As for a particular structure for the integration, the units are fixed to the supporting wall 10A not individually, but integrally. This prevents an error from occurring in the fixing. Accordingly, the alignment of the axis positions on the input side and the output side in the planetary gear mechanism can be maintained.

Because the output unit 13B' of the carrier 13' of the final stage is coupled to the photosensitive drum shaft 16 via the Oldham's coupling, if an misalignment occurs between the photosensitive drum shaft 16 and the output unit 13B' because of the supporting unit in the photosensitive drum 1, the photosensitive drum shaft 16 is allowed to rotate while absorbing the misalignment. Therefore, vibrations due to the eccentric rotation of the photosensitive drum 1 can be prevented from occurring.

In the embodiments described above, the structure of the planetary gear mechanism used for the deceleration mechanism provides the reduction ratio based on the gear ratio. However, the present invention is not limited to the structure.

Figure 11:
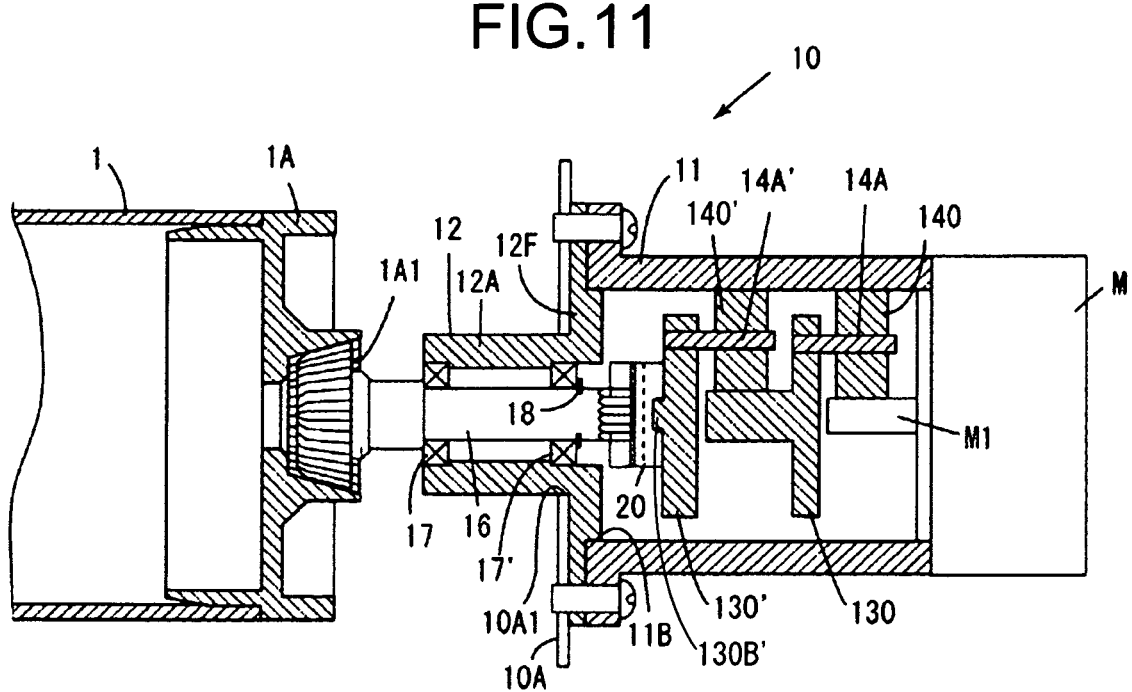
FIG. 11 is a schematic of a modification of the main parts according to the first embodiment of the present invention.
Figure 12:
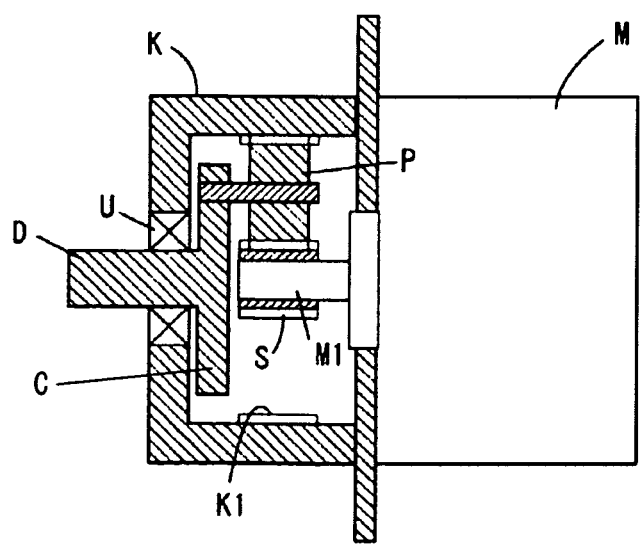
FIG. 12 is a schematic of a conventional example of a deceleration mechanism used for a driving device.

FIG. 11 is a schematic of a modification that provides a reduction ratio based on an engagement relationship other than meshing engagement. In FIG. 11, rollers are used instead of gears to provide a reduction ratio based on the ratio of the outside diameters of the rollers. More specifically, FIG. 11 is a schematic of the modification in which the Oldham's coupling 20 is used. In FIG. 11, the output shaft M1 of the driving motor M has no sun gear, and a pinion roller 140 supported by a carrier 130 is kept in contact therewith.

A pinion roller 140' supported by a carrier 130' of the final stage is kept in contact with the outer circumferential surface of the carrier 130. The Oldham's coupling 20 is fixed to an output unit 130B' of the carrier 130'.

The rollers are kept in frictional contact with each other on the outer circumferential surfaces thereof. The structure can provide a reduction ratio based on a principle similar to that in the structure using the gears.

In the structure, no gear tooth surface needs to be formed, thereby reducing a processing cost and meshing noise.

For the structure in which the parts of the first and the second support units are stacked as described above, the structure illustrated in FIGS. 2A and 2B can be used by changing a part thereof.

More specifically, FIG. 2B is a schematic of a structure in this case. In FIG. 2B, at the ends facing the supporting wall 10A in the first support unit 11 and the second support unit 12, the end of the first support unit 11 on the supporting wall 10A side is mounted on the step portion 12D provided to the second support unit 12.

In the step portion 12D, the inner surface of the end opening 11B of the first support unit 11 is fitted onto one of the right-angled side portions, that is, the side portion L2 along the horizontal direction in FIG. 2B.

The first support unit 11 having the end mounted on the step portion 12D is fastened together with the second support unit 12 to the supporting wall 10A. Accordingly, in the same manner as in the structure illustrated in FIG. 7, the units are integrated while the misalignment in the thrust direction and, the radial direction is prevented.

According to the present invention, the output shaft does not need to be extended directly from the output unit of the carrier.

In this manner, vibrations such as axial runout caused by elongation of the length of the output shaft are suppressed, whereby malfunction such as an eccentric operation in the driven member can be prevented from occurring. In addition, replacement of the output shaft or maintenance operations for the gears can be performed just by removing either of the support units. Therefore, unlike a device in which the housing itself is removed, replacement and maintenance operations can be performed on the parts individually, thereby providing advantages in the parts management cost and operating efficiency.

Furthermore, the output shaft that is insertable and removable in the support units is prevented from causing axial runout or the misalignment in the thrust direction and the radial direction by the joined portion of the support units and the shaft bearings arranged along the axial direction of the output shaft. Accordingly, the axis misalignment in the rotating shafts on the input side and the output side in the deceleration mechanism hardly occurs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving device comprising:
    a planetary gear deceleration mechanism in a transmission path that transmits driving force from a driving motor to a driven member, wherein
        the deceleration mechanism includes a first support unit and a second support unit into which a housing that constitutes a mechanism main body is divided, the second support unit is configured to be insertable to and removable from the first support unit,
        the first support unit includes a carrier of at least one stage and a pinion gear supported thereby, and is provided with an output unit in a carrier of a final stage,
        the second support unit includes an output shaft that is detachable from the output unit and a supporting unit for the output shaft,
        the output shaft in the second support unit joins with the output unit of the carrier in the first support unit simultaneously when the second support unit is inserted into the first support unit, and the output shaft in the second support unit detaches itself from the output unit in the first support unit simultaneously when the second support unit is removed from the first support unit.

2. The driving device according to claim 1, wherein a positioning unit that positions the first support unit and the second support unit in at least one direction of a thrust direction and a radial direction is provided to a joined portion of the first support unit and the second support unit.

3. The driving device according to claim 2, wherein the second support unit is fixed to and supported by a device main body, and
    the first support unit is fixed to the second support unit via the positioning unit in the joined portion.

4. The driving device according to claim 1, wherein the supporting unit for the output shaft includes a plurality of shaft bearing members along an axial direction of the output shaft.

5. The driving device according to claim 4, wherein one of the plurality of shaft bearing members is arranged at one end of the second support unit in an axial direction, and other of the plurality of shaft bearing members is arranged at a position corresponding to an insertion supporting opening of a supporting wall.

6. The driving device according to claim 1, wherein the output shaft is connected to the output unit of the carrier by spline engagement, and is insertable and removable in the axial direction.

7. The driving device according to claim 1, wherein the output unit provided to the carrier of the final stage is supported in a floating manner.

8. The driving device according to claim 1, wherein an insertion and removal portion of the output unit and the output shaft is provided with an Oldham's coupling.

9. The driving device according to claim 1, wherein the at least one stage and pinion gear is arranged and supported in trisected positions along a circumferential direction of the carrier.

10. The driving device according to claim 1, wherein the first support unit is fixed to a supporting wall with the second support unit which is fitted into an end opening of the first support unit.

11. The driving device according to claim 10, wherein the first support unit and the second support unit are fixed in a state where the respective axes on an input side and an output side coincide with each other in the planetary gear mechanism.

12. The driving device according to claim 1, wherein the output shaft is provided with a serration coupling of a tapered shape.

13. An image forming apparatus comprising:
 a driving device including a planetary gear deceleration mechanism in a transmission path that transmits driving force from a driving motor to a driven member, wherein the deceleration mechanism includes a first support unit and a second support unit into which a housing that constitutes a mechanism main body is divided, the second support unit is configured to be insertable to and removable from the first support unit,
 the first support unit includes a carrier of at least one stage and a pinion gear supported thereby, and is provided with an output unit in a carrier of a final stage,
 the second support unit includes an output shaft that is detachable from the output unit and a supporting unit for the output shaft, and
 the output shaft in the second support unit joins with the output unit of the carrier in the first support unit simultaneously when the second support unit is inserted into the first support unit, and the output shaft in the second support unit detaches itself from the output unit in the first support unit simultaneously when the second support unit is removed from the first support unit, and
 wherein a latent image carrier is supported detachably by the output shaft.

14. The image forming apparatus according to claim 13, wherein an engagement unit formed on an end plate is used as a supporting unit for the output shaft in the latent image carrier.

15. The driving device according to claim 1, wherein the first support unit and the second support unit are fixed to a supporting wall included in a device main body.

16. The driving device according to claim 15, wherein the first support unit is structured to allow the second support unit to fit into an end opening of the first support unit.

17. The driving device according to claim 15, wherein the second support unit further includes a boss unit.

18. The driving device according to claim 17, wherein the second support unit is structured to allow the boss unit through which the output shaft is inserted into an insertion supporting opening provided to the supporting wall included in the device main body.

19. The driving device according to claim 18, wherein the boss unit has a flange that can come into contact with the inner surface of the end opening provided to the first support unit.

20. The driving device according to claim 19, wherein, in the second support unit, the flange is inserted into the insertion supporting opening of the supporting wall to come into contact with the inner surface of the end opening of the first support unit.

* * * * *